United States Patent
Chiou et al.

[19]

[11] Patent Number: 6,125,535
[45] Date of Patent: Oct. 3, 2000

[54] METHOD FOR INSERT MOLDING A CONTACT MODULE

[75] Inventors: Song-Rong Chiou, Taipei; Nan-Tsung Huang, Keelung; Hui-Tze Tsai, Chung-Hua, all of Taiwan

[73] Assignee: Hon Hai Precision Ind. Co., Ltd., Taipei Hsien, Taiwan

[21] Appl. No.: 09/299,680

[22] Filed: Apr. 26, 1999

[30] Foreign Application Priority Data

Dec. 31, 1998 [TW] Taiwan ................................. 87121983

[51] Int. Cl.[7] .................................................. H01R 43/00
[52] U.S. Cl. .................................. 29/883; 29/882; 29/884
[58] Field of Search ............................ 29/884, 883, 874, 29/882

[56] References Cited

U.S. PATENT DOCUMENTS

| | | | |
|---|---|---|---|
| 3,618,207 | 11/1971 | Sand et al. ................................. | 29/884 |
| 4,628,597 | 12/1986 | Meehan et al. ........................... | 29/884 |
| 4,952,529 | 8/1990 | Grider ...................................... | 29/884 |
| 5,074,039 | 12/1991 | Hillbish et al. ........................... | 29/883 |
| 5,201,883 | 4/1993 | Atoh et al. ............................... | 29/883 |
| 5,779,505 | 7/1998 | Yagi et al. ................................ | 29/883 |
| 6,010,370 | 1/2000 | Aihara et al. ............................. | 29/883 |

Primary Examiner—Carl J. Arbes
Attorney, Agent, or Firm—Wei Te Chung

[57] ABSTRACT

A method for manufacturing an electrical connector having at least two rows of high density contacts, comprises steps of stamping and forming, depositing, insert molding, severing, and assembling. Each contact carrier strip has a number of contacts, a first carrier and a second carrier forming positioning structures thereon. Each contact includes a soldering section, a connecting section, a securing section and a contacting section jointed together end to end. The connecting sections of the contacts of different contact carrier strips are perpendicular to both the soldering sections and the securing sections. The contact carrier strips are deposited in a mold. A contact base is insert molded around the contacts for enclosing appropriate sections of the contacts thereby forming a contact module after properly depositing the contact carrier strips in the mold. The soldering sections of the contacts of different contact carrier strips are alternately aligned and remain in the same plane. The connecting sections of the contacts of different contact carrier strips separate the securing sections from the contacting sections due to different lengths thereof. The first and second carriers are cut away from the contact carrier strips to form a contact module which is assembled to other components.

13 Claims, 12 Drawing Sheets

METHOD FOR INSERT MOLDING A CONTACT MODULE

BACKGROUND OF THE INVENTION

The present invention relates to a method for insert molding a contact module, and particularly to a method for insert molding a contact module having at least two rows of high density contacts.

As the technology of communication networks and portable computers progresses, the exchange of information between different electronic instruments is increased. The miniaturization trend of computers limits the inner space of a computer and increases the density of inner components thereof. Thus, electrical connectors used for transmitting signals in the computer require a large quantity of electrical contacts arranged in a high density.

In conventional methods for manufacturing an electrical connector, as disclosed in Taiwan Patent Application Nos. 77208350, 79204276, 80209366 and 80213361, an inserting method is adopted to insert rows of contacts at appropriate positions in a housing of a connector. The contacts are then forced into the housing.

Referring to FIG. 1, a contact carrier strip 100 and an insulative housing 200 are manufactured by means of stamping and injection molding, respectively. The strip 100 includes a number of contacts 101. The housing 200 defines several rows of contact passageways 300. The contacts 101 are then forced into the contact passageways 300.

However, such an inserting method will damage the mechanical and electrical performance of the connector. The contact passageways of the housing are required to be increased in quantity as well as density. Side walls of the contact passageways with a uniform thickness becomes difficult. In addition, since the contacts interferentially engage with the side walls of the contact passageways, the contacts may wear away surfaces of the sidewalls thereby failing to effectively insulate the contacts from each other and adversely affecting signal transmission through the electrical connector. Furthermore, as surface mount technology (SMT) is commonly employed for attaching a large number of contacts to a circuit board with a high density, the contacts must exhibit good coplanarity for achieving a good electrical connection after soldering operation. However, soldering ends of the contacts will inevitably deform thereby disrupting coplanarity and adversely affecting the performance of the connector.

In order to overcome the deficiencies of the inserting method, one or more insulative inserting bases are employed to ensure the planarity of contacts of an electrical connector. Referring to U.S. Pat. No. 4,775,333 as shown in FIG. 2, the method first forms a plurality of electrical contact elements 400 and then positions the contact elements 400 into a mold for insert molding an insulative carrier element 500 and an insulative support base 550 therearound to form a module 600. The module 600 is then assembled into an electrical connector. Such a method can effectively overcome the disadvantages of the inserting method. However, due to the demand of a high density of electrical connectors, contacts containing carrier strips are no longer formed in only one row but many rows in a vertically overlapping relationship thereby complicating assembly. Thus, the simple insert molding mode of one row of contacts can not meet current requirements.

Further referring to U.S. Pat. No. 5,274,918, a method is adopted for manufacturing a shorting bar insert for placement in a modular jack assembly to provide for the selective shorting of predetermined contacts during periods of non-electrical engagement with a modular plug. However, the selective shorting of the contacts limits the type and amount of the contacts. In addition, the back-to-back arrangement of contact carrier strips is not suitable for contacts of many other types of electrical connectors.

BRIEF SUMMARY OF THE INVENTION

A main object of the present invention is to provide a method for insert molding a contact module having at least two rows of high density contacts.

A second object of the present invention is to provide a method for properly positioning contact carrier strips in a mold with cooperation of mold cores as well as other positioning means formed in the mold.

A third object of the present invention is to provide contact carrier strips having positioning structures for ensuring proper positioning thereof in a mold during an insert molding process.

In order to achieve the purposes set forth, a method in accordance with the present invention aims to arrange at least two rows of vertically aligned contacts by means of insert molding. At least two contact carrier strips are stamped to form a number of contacts between two carriers. Each carrier defines a plurality of positioning holes having different diameters alternately arranged thereon. The contact carrier strips are positioned in a mold and insert molded to form a contact base around the contacts thereby forming a contact module. The mold has a plurality of mold cores and positioning means respectively cooperating each other and with the positioning holes of the contact carrier strips to ensure proper positioning of the contact carrier strips, and to ensure that contact sections of the contacts are spaced from each other and that soldering sections of the contacts remain in a common plane. The two carriers are cut away from the two contact carrier strips. The contact module is then assembled with other components of the connector.

In accordance with one aspect of the present invention, the positioning holes of the contact carrier strips cooperate with the mold cores and the positioning means of the mold thereby spacing the two contact carrier strips and securing the adjacent contacts in each contact carrier strip. Thus, the mold cores of the mold enclose and fix securing sections of the contacts received in the mold thereby ensuring proper insert molding. The contact base receives at least two rows of high density modular contacts. An insulative housing and other components of the connector together can be assembled to the contact base thereby increasing reliability of assembly and signal transmission quality of the connector.

Other objects, advantages and novel features of the invention will become more apparent from the following detailed description when taken in conjunction with the accompanying drawings.

DETAILED DESCRIPTION OF THE INVENTION

The present invention relates to a method for insert molding a contact module having at least two rows of modular contacts. For facilitating description, two contact carrier strips each comprising a plurality of modular contacts are discussed below.

Figure 1:
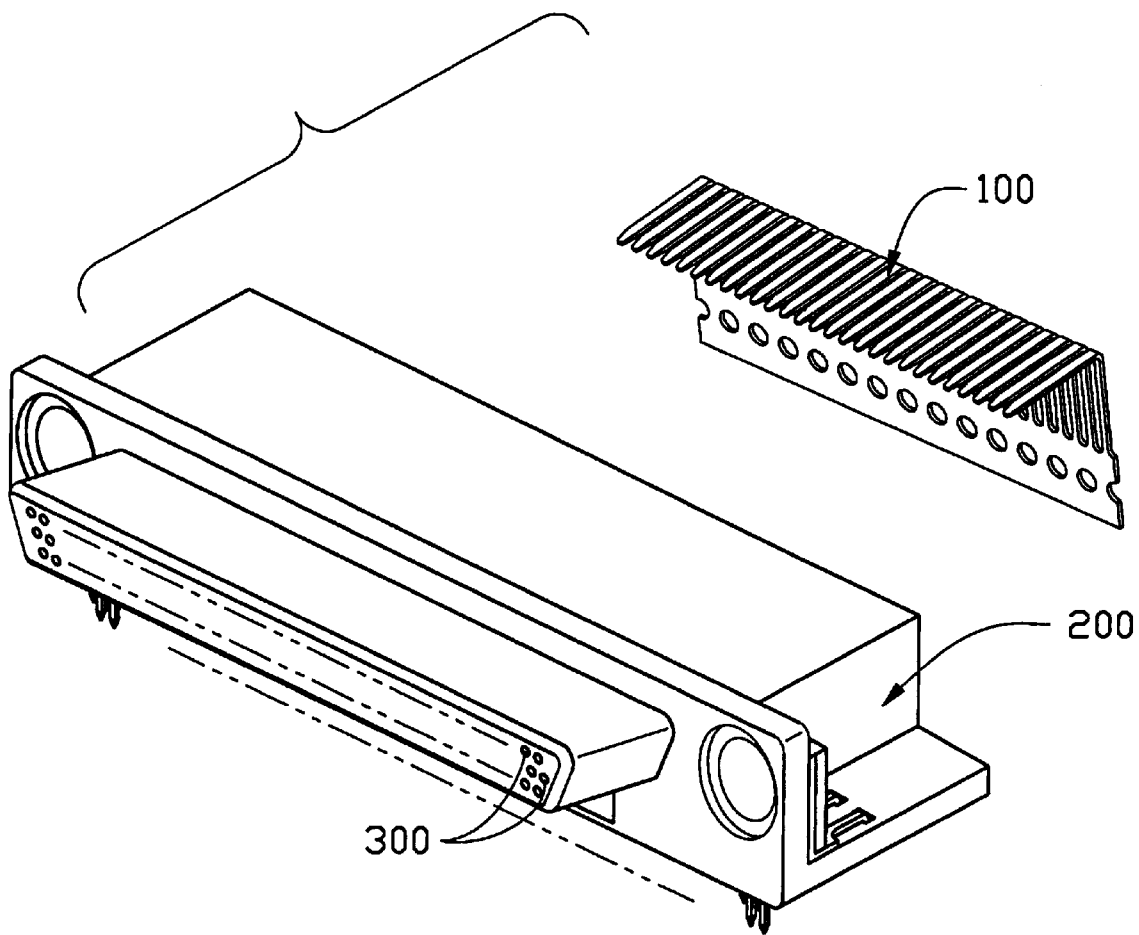
FIG. 1 is an exploded view of contacts and a housing of a conventional electrical connector.
Figure 2:
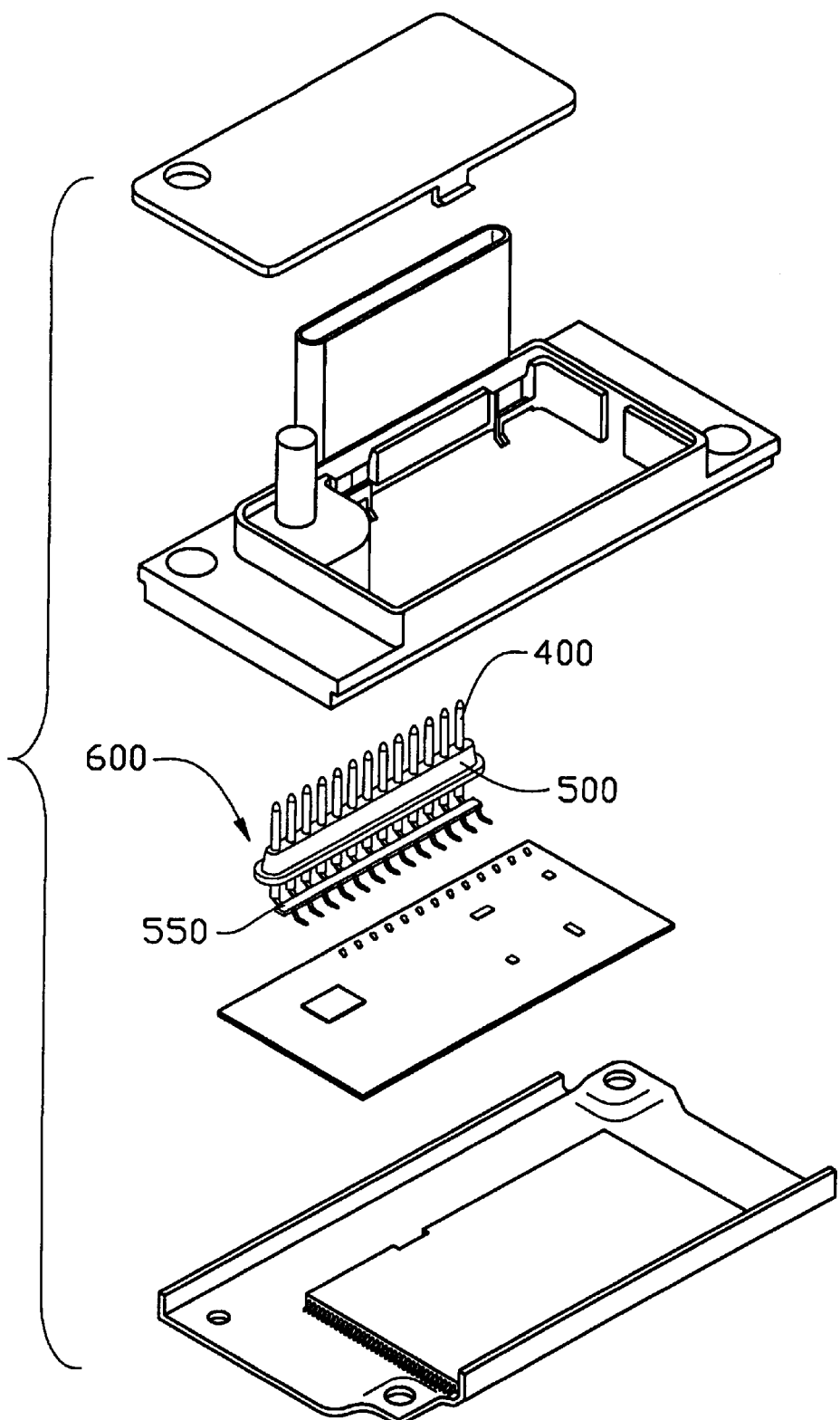
FIG. 2 is an exploded view of modular contacts and a housing of another conventional electrical connector.
Figure 3:
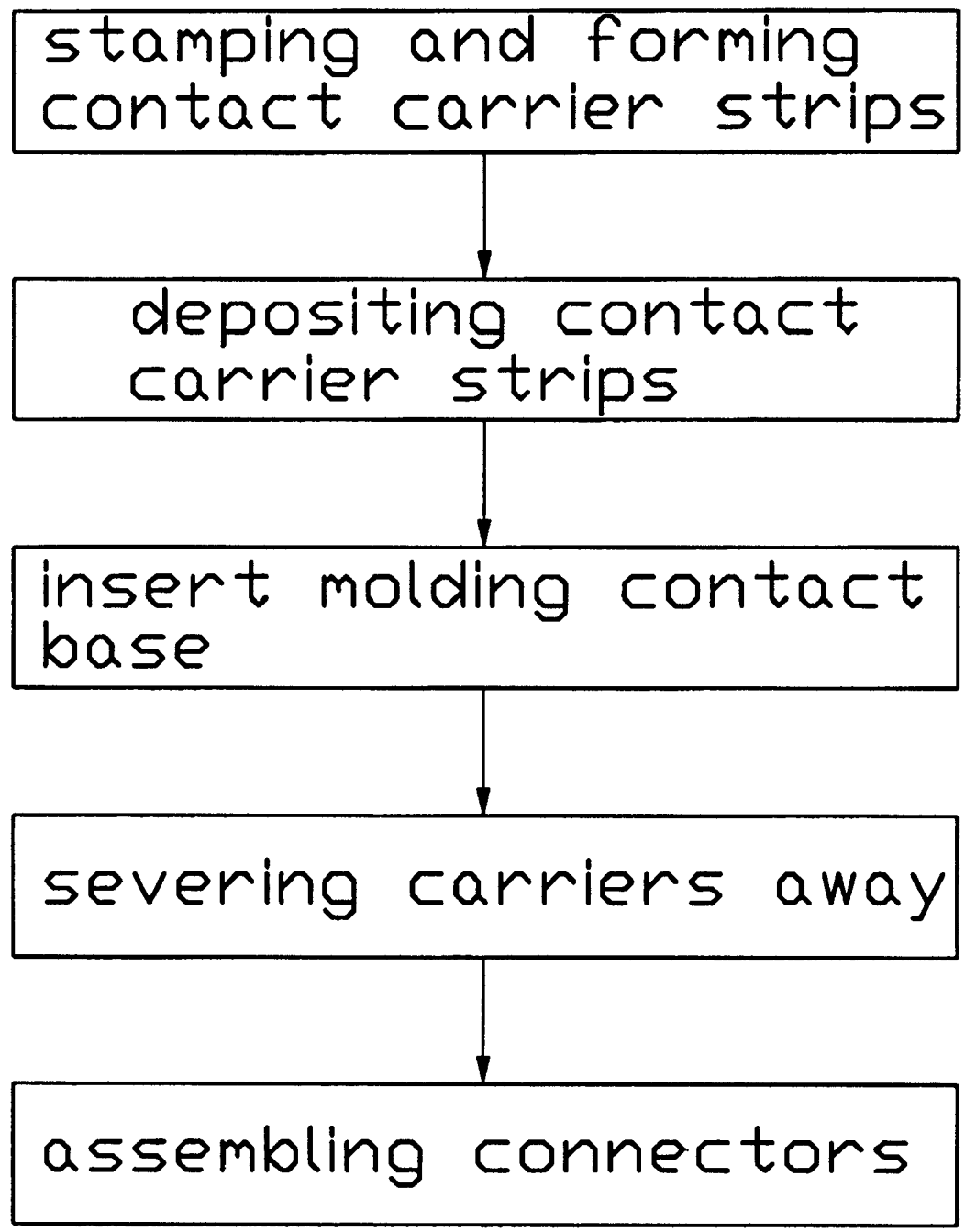
FIG. 3 is a flow chart of a method for forming modular contacts of an electrical connector in accordance with the present invention.
Figure 4:
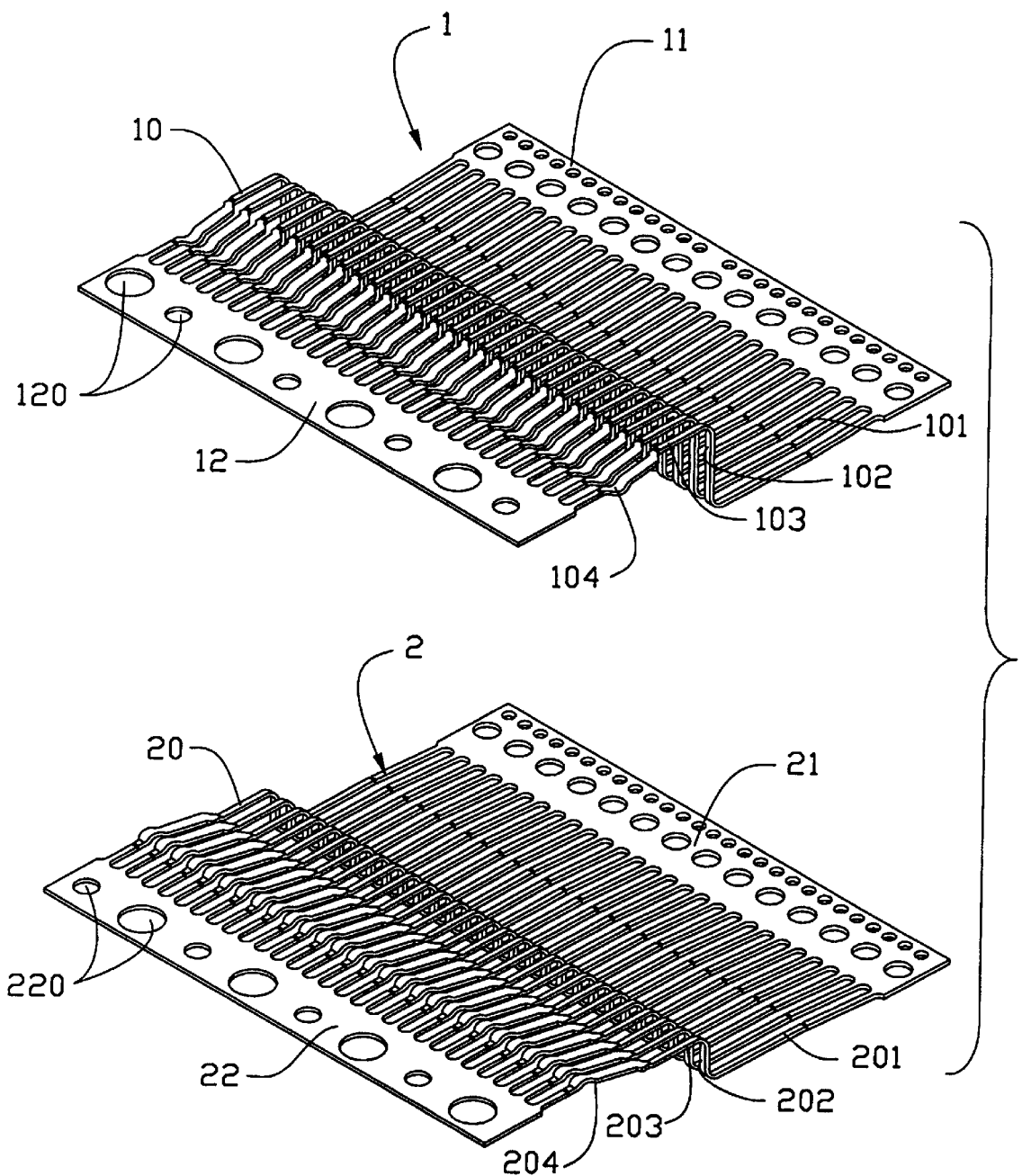
FIG. 4 is a perspective view of two contact carrier strips of the present connector.
Figure 7:
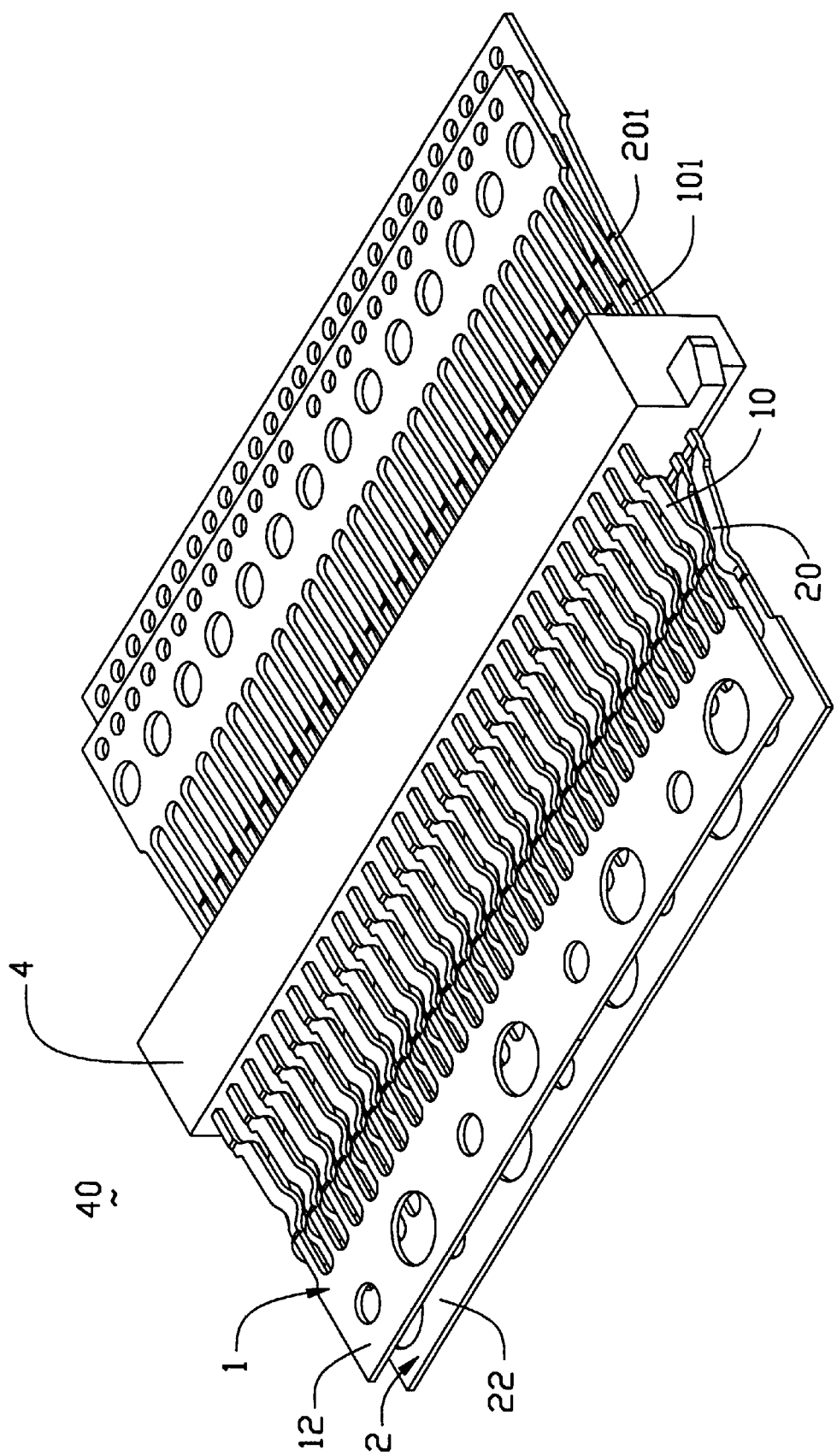
FIG. 7 is a perspective view of the contact carrier strips cooperating with the contact base.

Referring to FIGS. 3, 4 and 7, a method for manufacturing an electrical connector having at least two rows of high density modular contacts in accordance with the present invention properly positions first and second contact carrier strips 1, 2 in a mold 3 for insert molding a contact base 4 around the contact carrier strips 1, 2 by an insert molding procedure whereby the modular contacts have a high density. The method concludes a stamping and forming step, a depositing step, a severing step and an assembling step.

In the stamping and forming step, raw material sheets are prepared to adapt to forming contacts. The raw material sheets are stamped to form the first and second contact carrier strips 1 and 2 at predetermined length. Each first and second contact carrier strip 1 and 2 defines a first carrier 11, 21, a second carrier 12, 22 and a plurality of contacts 10, 20 between the first carrier 11, 21 and the second carrier 12, 22. Each contact 10, 20 is properly offset relative to adjacent contacts 10, 20. Each second carrier 12, 22 defines a plurality of positioning holes 120, 220 alternately aligned with different diameters for cooperating with positioning structures of the mold 3 (FIG. 5).

Each contact 10, 20 comprises a soldering section 101, 201, a connecting section 102, 202, a securing section 103, 203 and a contacting section 104, 204 arranged end to end. The connecting section 102, 202 is perpendicularly formed between the securing section 103, 203 and the soldering section 101, 201. The connecting sections 102 of the contacts 10 are longer than the connecting sections 202 of the contacts 20 thereby ensuring that the securing sections 103 and the contacting sections 104 of the contacts 10 are offset an appropriate distance from the securing sections 203 and the contacting sections 204 of the contacts 20. In addition, the contacting section 104, 204 of each contact 10, 20 angularly extends from the corresponding securing section 103, 203. The contacting section 104 of each contact 10 is offset from the securing section 103, and the contacting section 204 of each contact 20 is offset the same distance from the securing section 203 thereof in an opposite direction. The contacting section 104 of each contact 10 is precisely aligned with the contacting section 204 of the corresponding contact 20 after insert molding the contact base 4 when the first and second contact carrier strips 1, 2 are deposited aligning together in the depositing step.

Figure 5:
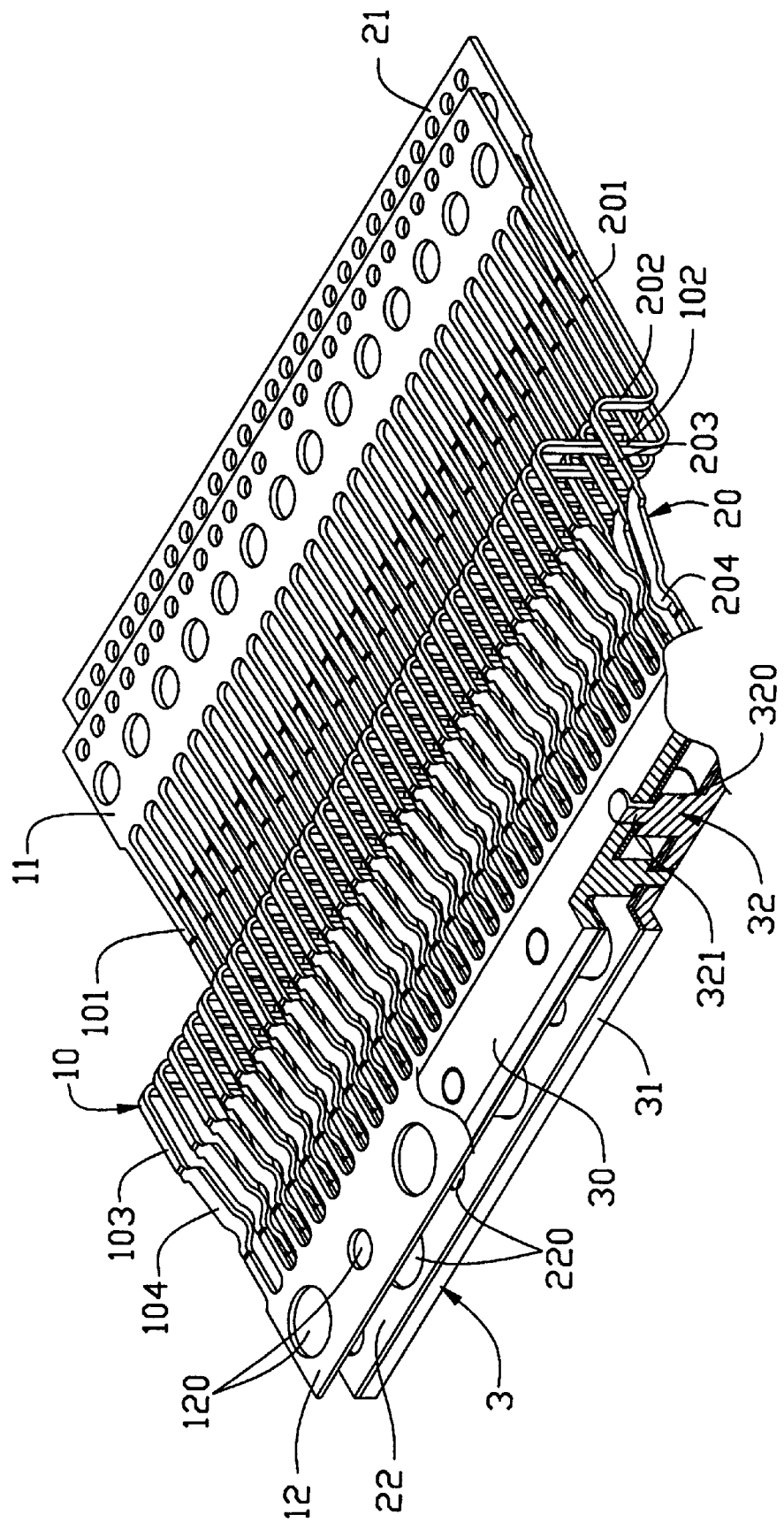
FIG. 5 is a partial, cross sectional view of the contact carrier strips cooperating with positioning structures of a mold in accordance with the present invention.
Figure 6:
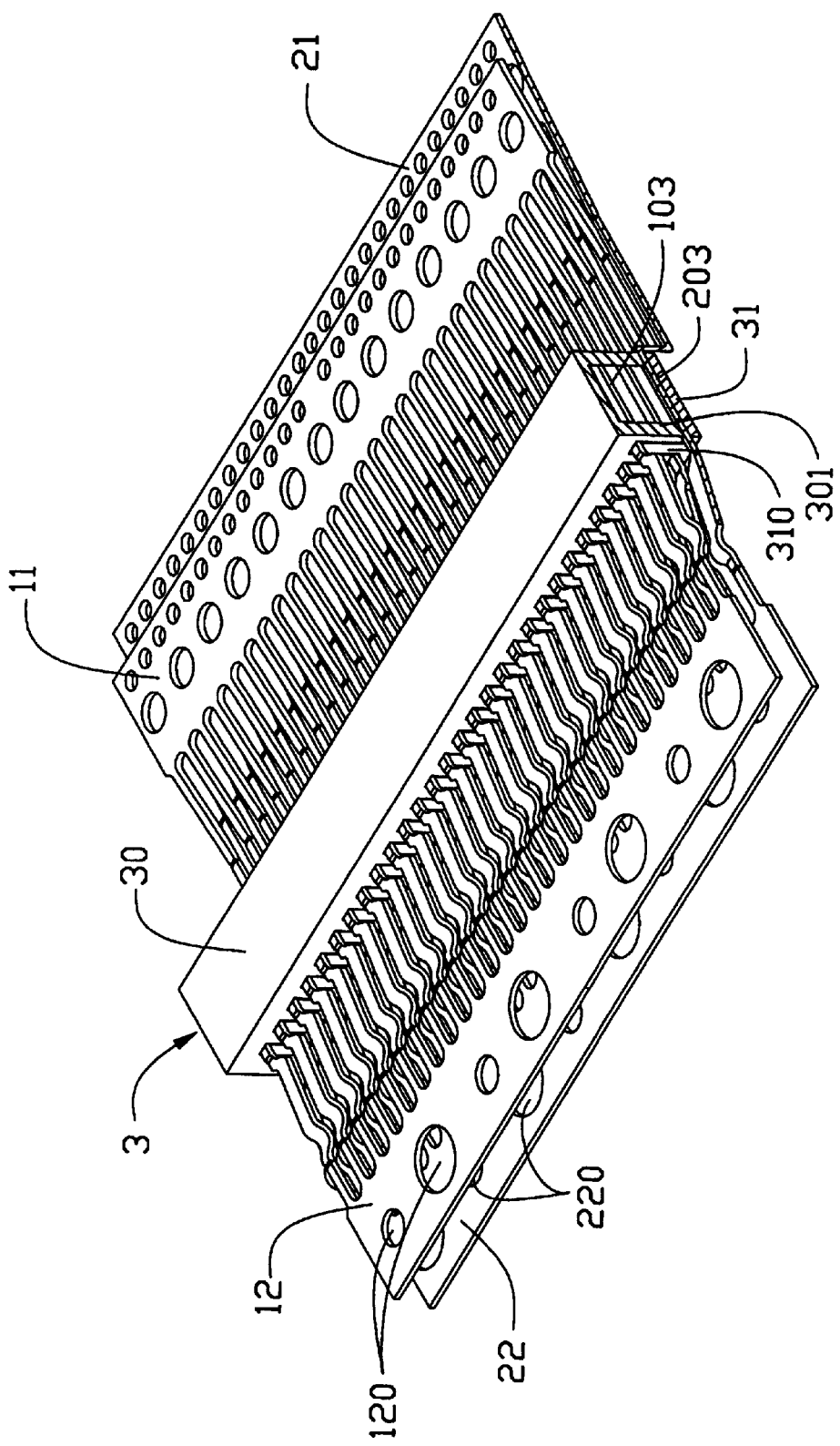
FIG. 6 is a partial, cross sectional view of the contact carrier strips and a contact base insert molded therearound.

Referring to FIGS. 5 and 6, in the depositing step, the first and second contact carrier strips 1, 2 are deposited at appropriate positions in the mold 3. The mold 3 includes an upper base 30 mating with a lower base 31. Both the upper base 30 and the lower base 31 integrally form a plurality of mold cores 301, 310 arranged in two aligning rows. The distance between adjacent mold cores 301 of the upper base 30 is equal to a width of each mold core 310 of the lower base 31 and the distance between adjacent mold cores 310 of the lower base 31 is equal to a width of each mold core 301 of the upper base 30. Therefore, the mold core 301, 310 of one base 30, 31 are received in spaces defined between two corresponding mold cores 310, 301 of the other base 31, 30. The upper and lower bases 30, 31 form positioning posts 32 having a thick portion 320 and a thin free end 321. The thick portion 320 and the thin free end 321 are fit into corresponding positioning holes 120, 220 of the second carrier 12, 22 of the first and second contact carrier strips 1, 2.

Figure 11:
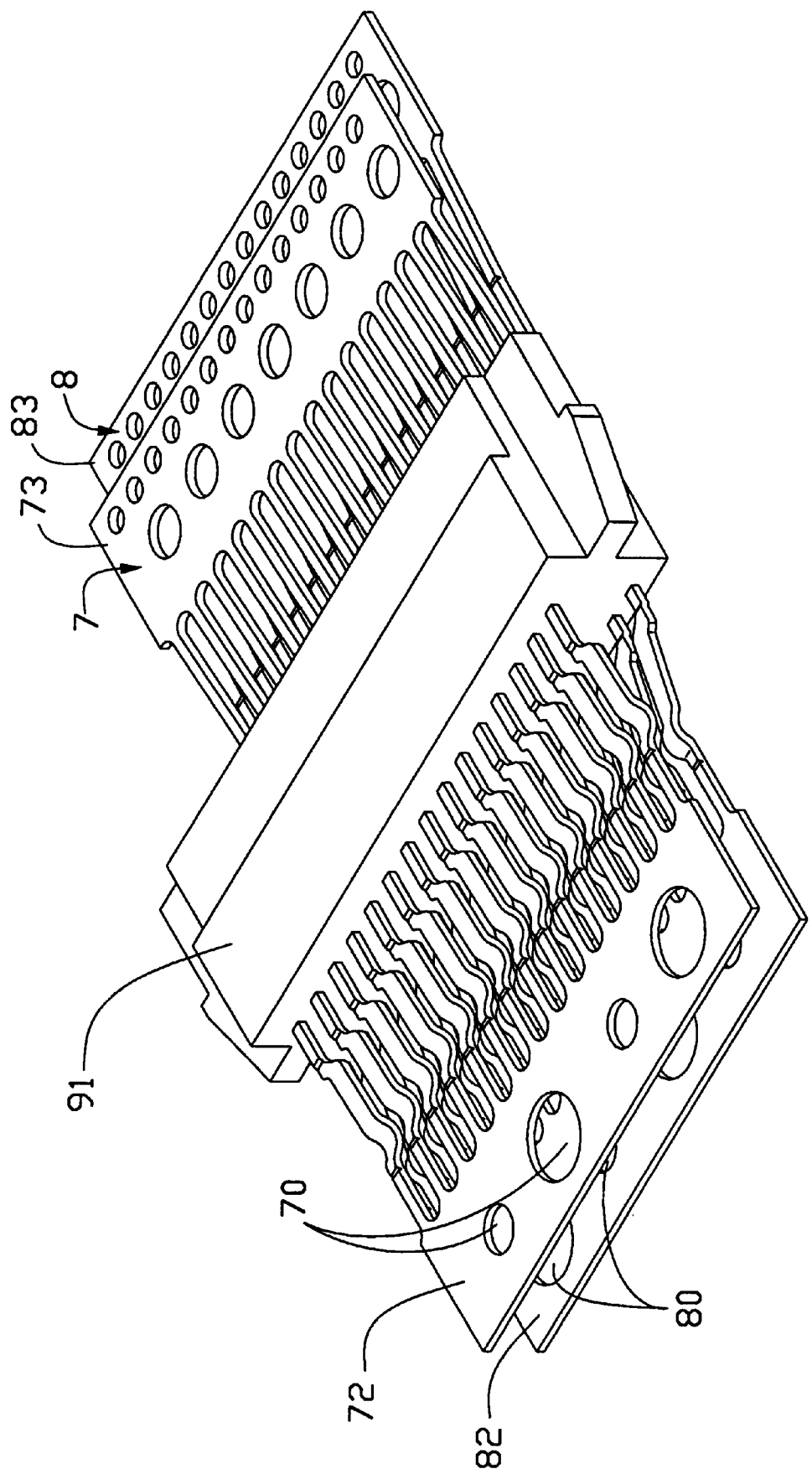
FIG. 11 is a perspective view of two contact carrier strips and a contact base in accordance with a second embodiment of the present invention.
Figure 12:
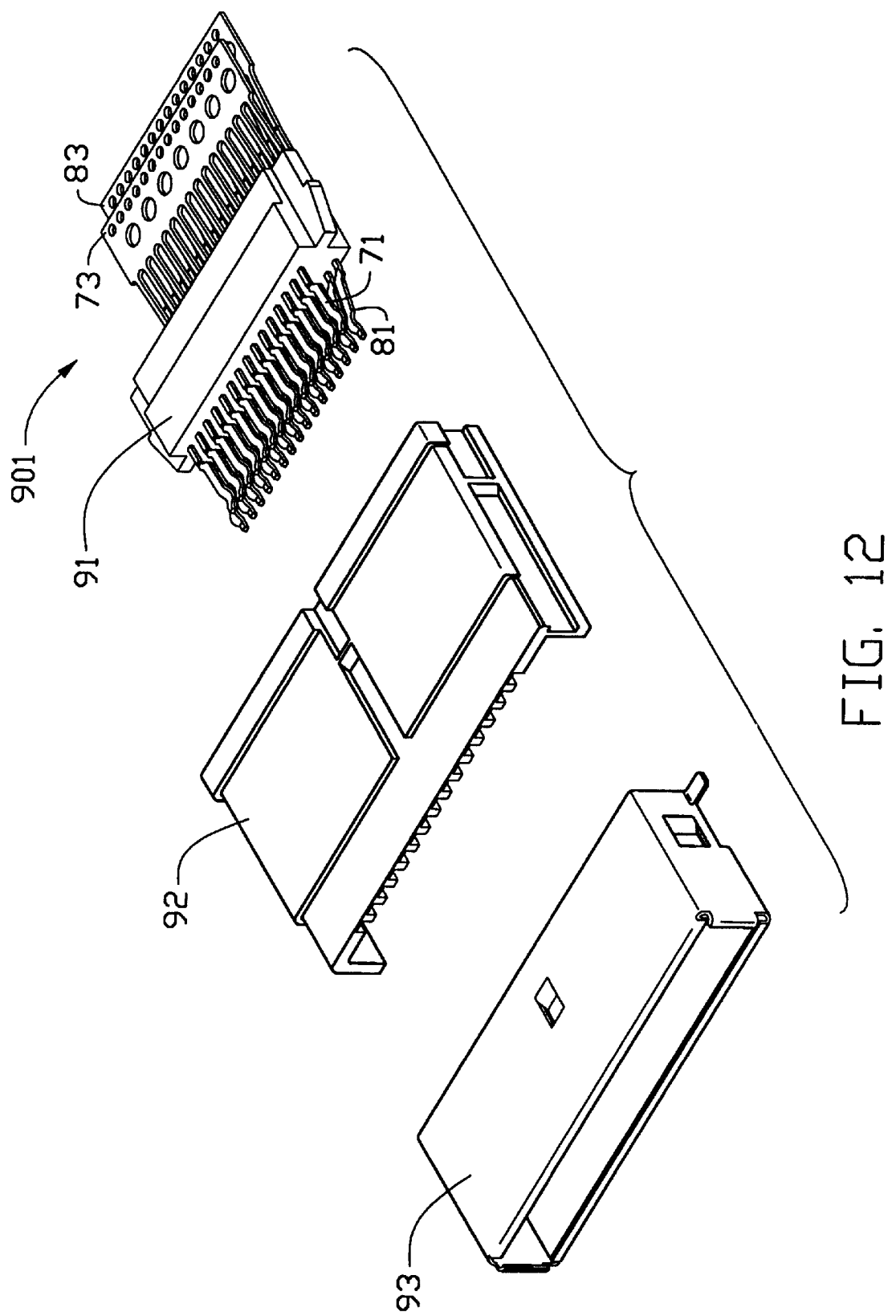
FIG. 12 is an exploded view of the contact carrier strips and the contact base of FIG. 11 and other components of the connector.

The first and second contact carrier strips 1, 2 are vertically aligned with each other. The positioning holes 120 of the second carrier 12 of the first contact carrier strip 1 are alternately aligned with the positioning holes 220 of the second carrier 22 of the second contact carrier strip 2 for receiving the corresponding thick portions 320 and the thin free ends 321 of the positioning posts 32 of the upper base 30 and the lower base 31 thereby spacing pairs of aligned contacts 10, 20. The mold cores 301, 310 of the upper and lower bases 30, 31 engage with each other thereby forming passageways (not shown) proximate free ends of the mold cores 301, 310 for extension of the securing sections 103, 203 of the corresponding contacts 10, 20 therethrough. Thus, the soldering sections 101 of the contacts 10 are horizontally offset relative to the soldering sections 201 of the contacts 20. The connecting sections 102, 202 of the contacts 10, 20 are aligned and staggered with each other, while the securing sections 103, 203 and the contacting sections 104, 204 are aligned and staggered with each other because of the different lengths of the connecting sections 102 and the connecting sections 202. The connecting sections 102, 202 can be enclosed by the mold cores 301, 310 of the upper and lower mold bases 30, 31 as described in this embodiment, or can be exposed outside of the mold cores 301, 310 as shown in FIGS. 11, 12 describing a second embodiment to be further depicted below.

In the insert molding step, the contact base 4 is molded onto the first and second contact carrier strips 1, 2 thereby enclosing the securing sections 103, 203 of the contacts 10, 20.

When the upper base 30 is engaged with the lower base 31, the mold cores 301, 310 extend between adjacent securing sections 103, 203. The contacting sections 104, 204 are vertically aligned in pairs and the soldering sections 101, 201 remain in the same plane. Thus, the soldering section 101 of each contact 10 is positioned between soldering sections 201 of the adjacent contacts 20. The two first carriers 11, 21 of the contact carrier strips 1 and 2 are slightly inclined away from each other whereby the soldering sections 103, 203 are resiliently offset a slight distance. When the upper base 30 is separated from the lower base 31 or when the first carriers 11, 21 are cut away from the first and second contact carrier strips 1, 2, the soldering sections 101 of the contacts 10 will lie in the same plane as the soldering sections 201.

Figure 8:
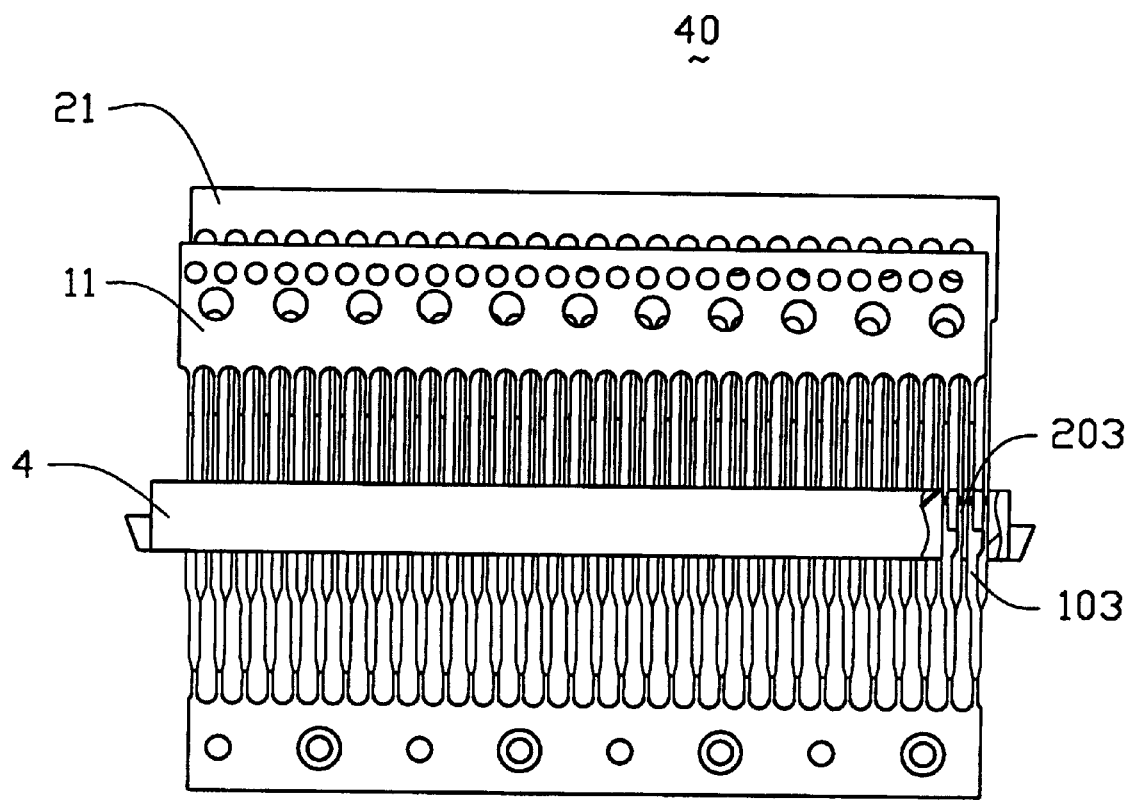
FIG. 8 is a top planar view of FIG. 7 with a part of the contact base being cut away.
Figure 9:
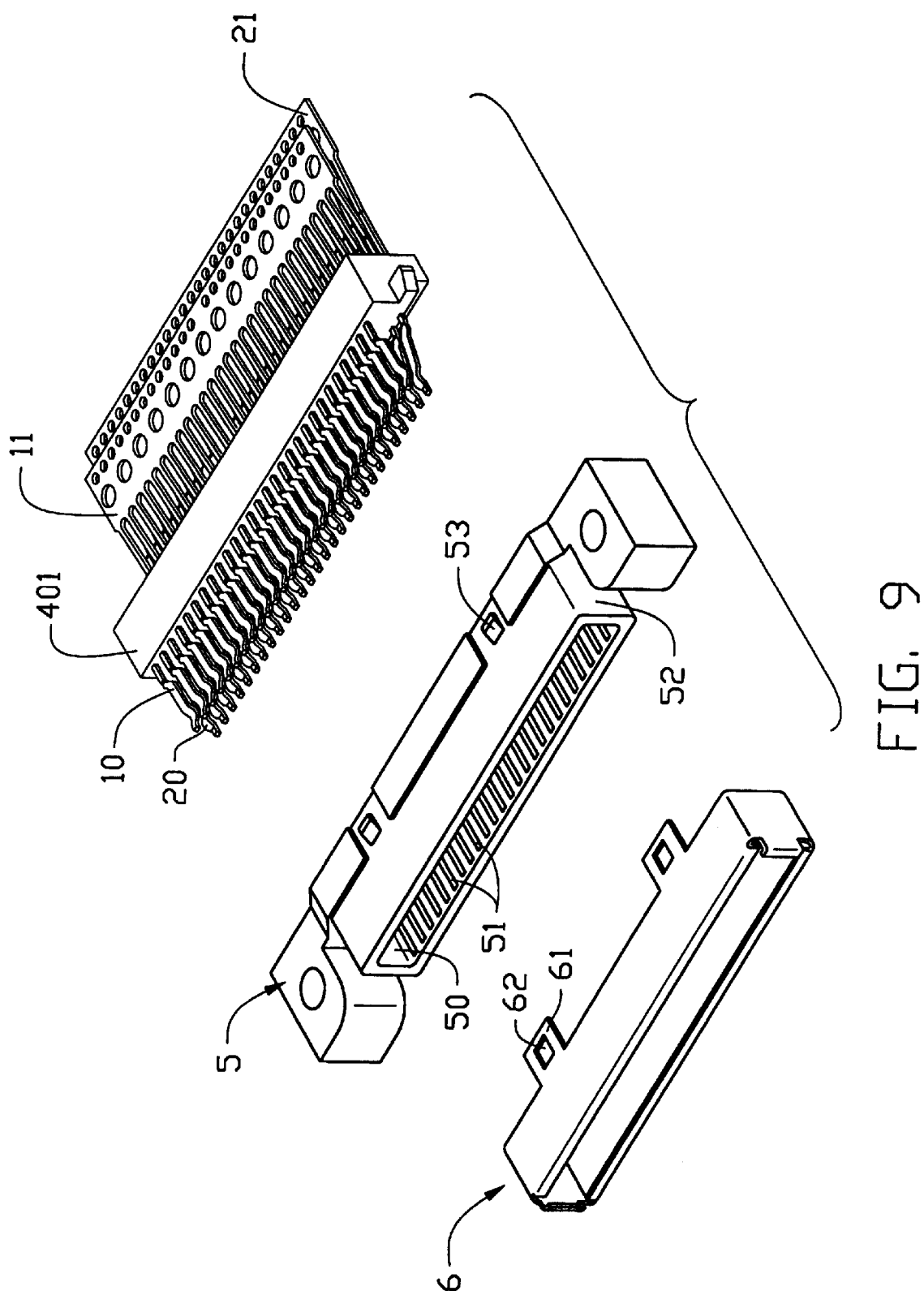
FIG. 9 is an exploded view of the contact carrier strips along with the contact base and other components of the connector.

The positioning posts 32 are received in the corresponding positioning holes 120 for retaining the contacts 10, 20 in position in the mold 3. The mold cores 301, 310 engage with each other to enclose the portion of the contacts 10. 20 received in the mold 3 after the upper base 30 is attached to the lower base 31. The contact base 4 is then insert molded thereby enclosing the securing sections 103, 203 of the contacts 10, 20 therein and forming a contact module 40 (FIG. 7). In the severing step, the second carriers 12, 22 are cut away from the first and second contact carrier strips 1, 2, as shown in FIGS. 8 and 9 thereby forming another contact module 401 (FIG. 9) having high density contacts. The contact module 401 can be assembled to a housing 5 and other components of a connector.

Figure 10:
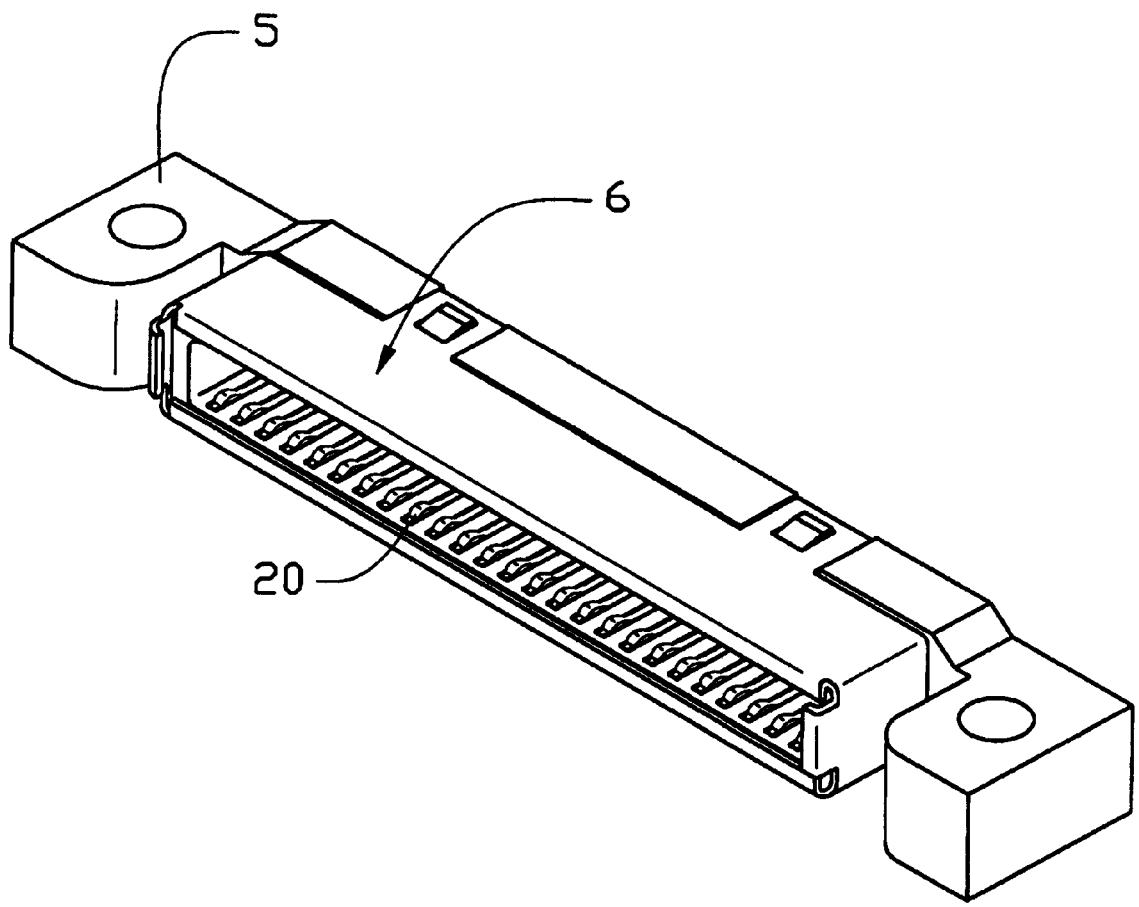
FIG. 10 is an assembled view of FIG. 9.

Referring to FIGS. 9 and 10, the housing 5 forms a mating side 52 having a receiving chamber 50. A plurality of contact passageways 51 are defined in opposite inner side walls of the receiving chamber 50. Two protrusions 53 are formed on an outer side wall of the receiving chamber 50. In the assembling step, the contact module 401 is assembled into the receiving chamber 50 of the housing 5 and the contacting sections 104, 204 extend into the corresponding contact passageways 51. A shell 6 encloses the mating side 52 of the housing 5. The shell 6 has two tabs 61 extending from one side wall thereof. Each tab 61 defines an aperture 62 therein for engaging the corresponding protrusion 53 of the housing 5.

The first carriers 11, 21 are cut away from the first and second contact carrier strips 1, 2 thereby forming a finished connector, as shown in FIG. 10. The soldering sections 101, 201 will lie in the same plane for facilitating the soldering process.

The present invention can be adapted to many other types of connectors having a large quantity of high density contacts, such as the connector of the second embodiment shown in FIGS. 11 and 12. Two contact carrier strips 7, 8 are stamped and a plurality of positioning holes 70, 80 having different diameters are alternately aligned in second carriers 72, 82 of the contact carrier strips 7, 8. A contact base 91 is insert molded around the contacts using the same procedures described in the first embodiment. The second carriers 72, 82 are cut away from the first and second contact carrier strips 7, 8 thereby forming a contact module 901. The contact module 901 is inserted into a housing 92 and a shell 93 is fixed onto the housing 92. The first carriers 73, 83 are cut away from the first and second contact carrier strips 7, 8 thereby forming a finished connector.

The method in accordance with the present invention also adapts to insert molding a contact base around appropriate parts of more than two rows of high density contacts, for example, to insert molding a contact base around appropriate parts of three rows of high density contacts. Cases of three or more rows of contact carrier strips are very similar to the case of two rows of contact carrier strips. Therefore, here only give a concise description below. Firstly, manufacturing three contact carrier strips defining a plurality of positioning structures, such as positioning holes, on corresponding carrier of each contact carrier strip. Secondly, depositing the three contact carrier strips to a mold comprising an upper base and a lower base, the positioning structures of each contact carrier strip cooperating with corresponding positioning structures of the mold thereby securing the contact carrier strips in position. Thus, contacting sections of different rows of contacts are vertically aligned in pairs and corresponding soldering sections remain in the same plane. Corresponding soldering section of each contact is positioned between soldering sections of adjacent contacts. Corresponding three first carriers of the contact carrier strips are slightly inclined away from each other whereby the soldering sections are resiliently offset a slight distance. When the upper base is separated from the lower base or when the first carriers are cut away from the three contact carrier strips, the soldering sections of each contact will lie in the same plane as the soldering sections. Thirdly, insert molding an insulative contact base around securing sections of the contacts. Fourthly, severing the first and second carriers away from the contact carrier strips thereby achieving a contact module. Lastly, assembling the contact module with other components together thereby achieving a finished connector.

The method in accordance with the present invention effectively eliminates conventional procedures such as pre-insertion and forcing of contacts into a housing of a connector thereby achieving good planarity of sections of the contacts for SMT by insert molding a contact base. The present method also prevents mechanical damage from being occurred on the contacts and side walls of contact passageways of the housing due to a frictional force acting on the side walls during insertion of the contacts into the housing thereby ensuring high quality signal transmission through the connector.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for insert molding a contact module, comprising steps of:

(a) stamping and forming at least two rows of contact carrier strips, each contact carrier strip comprising a plurality of contacts, a first carrier and a second carrier, each second carrier forming positioning structures having a plurality of positioning holes, the positioning holes of different contact carrier strips having different diameters and being alternately aligned, a plurality of contacts being formed with the first carrier and each having a soldering section joined with the first carrier, a securing section, a connecting section connecting the soldering section with the securing section, and a contacting section joined with the second carrier, the connecting section of each contact being substantially perpendicular to both the soldering section and the securing section, and the connecting sections of the different contact carrier strips having different lengths;

(b) depositing the contact carrier strips in predetermined positions of a mold to enable the positioning structures of the mold to cooperate with the positioning structures of the contact carrier strips for spacing and positioning the contacts; and (c) insert molding a contact base around appropriate portions of the contacts received in the mold to form a contact module, the securing section of each contact being received in the contact base.

2. The method as claimed in claim 1, wherein the depositing step comprises preparing a mold comprising an upper base and a lower base, the positioning structures being a plurality of positioning posts each forming a thick portion end and a thin free end, each positioning post being received in the corresponding positioning holes of the carriers.

3. The method as claimed in claim 2, wherein the depositing step comprises depositing the two contact carrier strips in the lower base, the securing sections of the contacts being the thin free end of each positioning post of the mold, the thin free ends of each positioning post being received in the corresponding small positioning holes of one carrier, and the thick portion of the same positioning post being received in the corresponding large positioning holes of the other carrier.

4. The method as claimed in claim 3, wherein the depositing step comprises laterally offsetting the contacting sections of the contacts of the first and second contact carrier strips to align each other in the mold.

5. The method as claimed in claim 4, wherein the depositing step comprises separating the securing sections and the contacting sections of the contacts of the different contact carrier strips from each other while aligning the soldering sections of the contact carrier strips in a same plane.

6. The method as claimed in claim 5, wherein the depositing step comprises aligning small positioning holes of the second carrier of one contact carrier strip with large positioning holes of the second carrier of the other contact carrier strip in the mold.

7. The method as claimed in claim 6, wherein the insert molding step insert molds the contact bases around the securing sections of the contacts of the corresponding contact carrier strips after the upper and lower bases are assembled together.

8. The method as claimed in claim 1, wherein an assembling step follows the insert molding step to assemble the contact module with other components of the connector.

9. A method for manufacturing an electrical connector comprising the following steps:

stamping and forming at least two contact carrier strips each having a plurality of contacts, a first carrier, and a second carrier, each contact comprising at least a contacting section, a securing section, a soldering section parallel to the securing section, and a connecting section joined with the securing section and the soldering section and perpendicular to both the securing section and the soldering section, the soldering sections of the contacts of different contact carrier strips having different lengths thereby reducing the instance of deformation due to vertical alignment between different contact carrier strips, the securing sections of different contact carrier strips being alternately aligned and remaining in the same plane after the contact carrier strips are positioned in a mold, and the contacting sections of different contact carrier strips facing each other and being laterally offset from each other in opposite directions thereby vertically aligning with each other when the two contact carrier strips are deposited in the mold, the second carriers of contact carrier strips each defining a plurality of positioning holes having different diameters alternately aligned with each other, small positioning holes of the second carrier of one contact carrier strip aligning with large positioning holes of the second carrier of the other contact carrier strip when the two contact carrier strips are positioned in the mold; and insert molding a contact base to enclose the securing sections of the contacts received in a mold with the securing sections of the contacts of the different contact carrier strips being alternately aligned.

10. The method as claimed in claim , wherein the depositing step includes the step of preparing the mold comprising an upper base and a lower base, the positioning structures of the mold being a plurality of positioning posts each forming a thick portion and a thin free end, each positioning post being received in the corresponding positioning holes of the carriers.

11. The method as claimed in claim 10, wherein the depositing step deposits the two contact carrier strips in the lower base, the securing sections of the contacts being the thin free end of each positioning post of the mold received in the corresponding small positioning holes of one carrier and the thick portion of the same positioning post received in corresponding large positioning holes of the other carrier, the upper and lower bases being assembled together, the contact base being insert molded to enclose the securing sections of the contacts of the two contact carrier strips.

12. The method as claimed in claim 9, wherein an assembling step follows the insert molding step to assemble the contact module with other components of the connector.

13. A method for manufacturing an electrical connector comprising the following steps:

stamping and forming at least two contact carrier strips each having a plurality of contacts, a first carrier and a second carrier defining a plurality of positioning holes with different diameters, each contact comprising at least a contacting section and a securing section, preparing a mold comprising an upper base and a lower base and depositing the two contact carrier strips in the lower base of the mold, the securing sections of the contacts of the two contact carrier strips being vertically and alternately aligned and the contacting sections of the two contact carrier strips facing each other, the mold forming a plurality of positioning posts each forming a thick portion and a thin free end, each positioning post being received in the corresponding positioning holes of the carriers, the thin free end of each positioning post of the mold being received in the corresponding small positioning holes of the one carrier strip and the thick portion of the same positioning post being received in corresponding large positioning holes of the other carrier, the upper and lower bases being assemble together; and insert molding a contact base to enclose the securing sections of the contact received in the mold with the securing sections of the contacts of the two contact carrier strips being alternately aligned.

* * * * *